Jan. 15, 1957 R. W. WILLIS 2,777,353
SCREW SOCKET CONSTRUCTION HAVING TOOL
GUIDING MEANS FORMED THEREIN
Filed Oct. 30, 1952 4 Sheets-Sheet 4
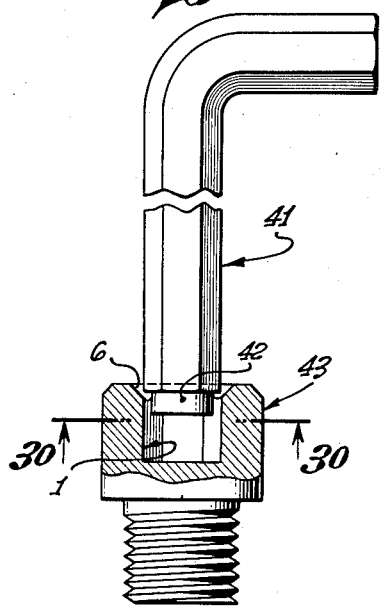
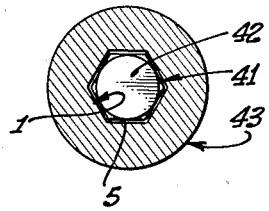
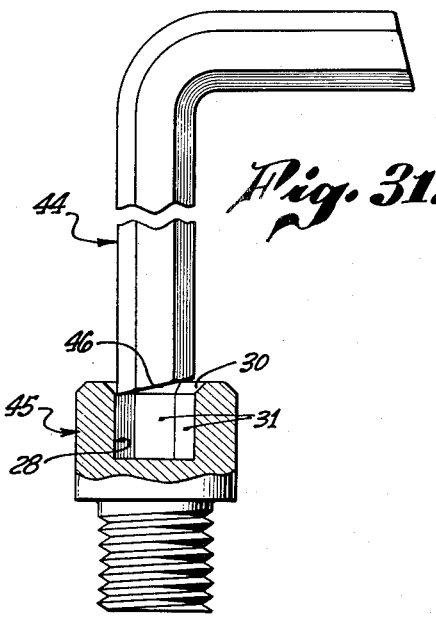
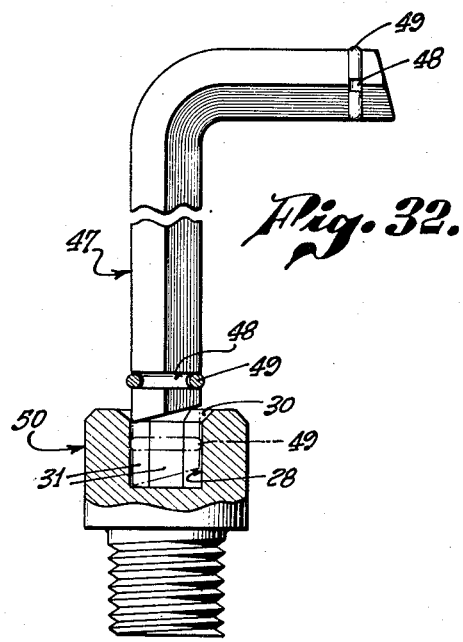
INVENTOR.
ROBERT W. WILLIS
BY
Paul A. Weilein
ATTORNEY.

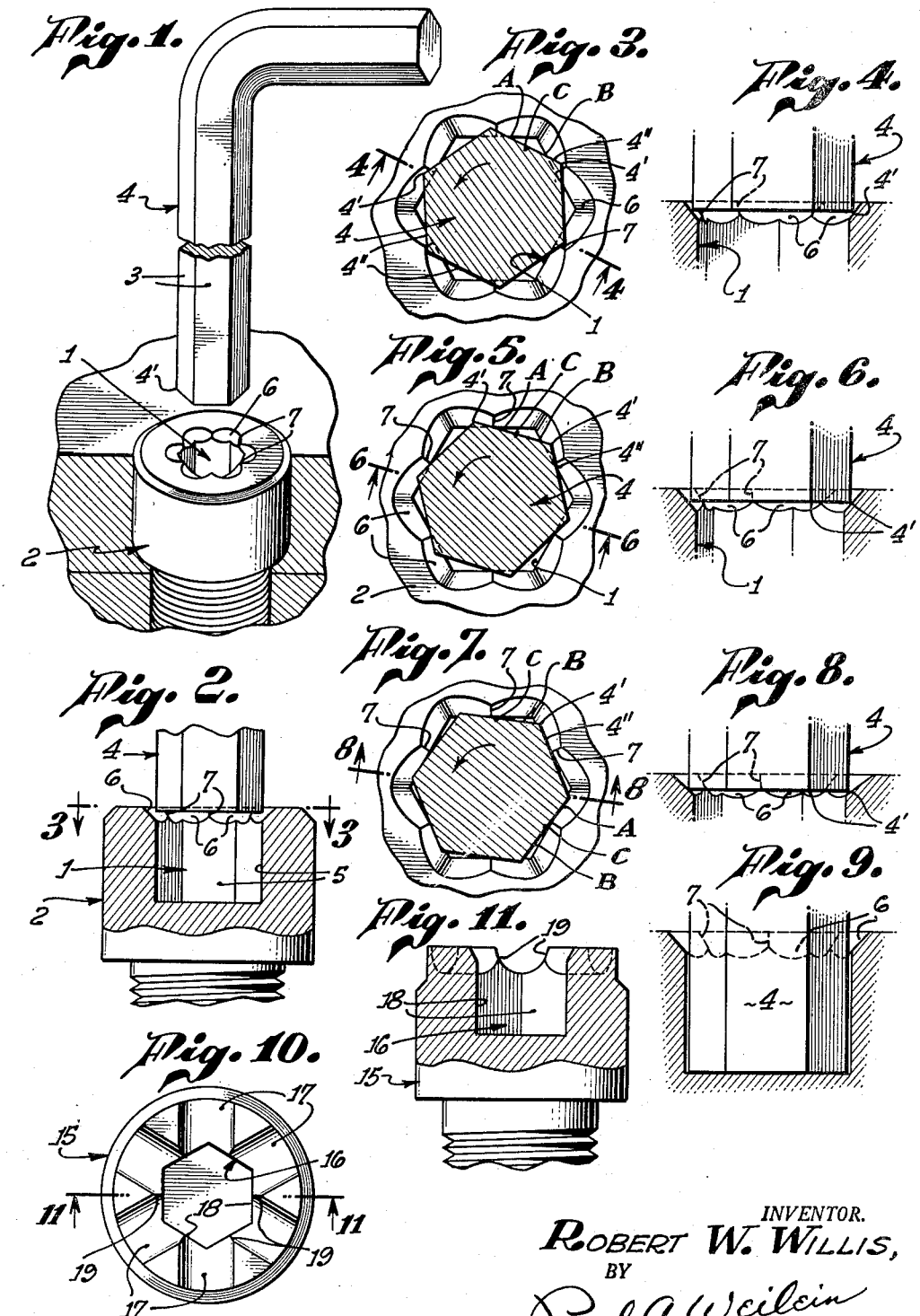

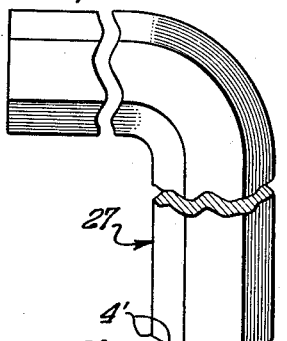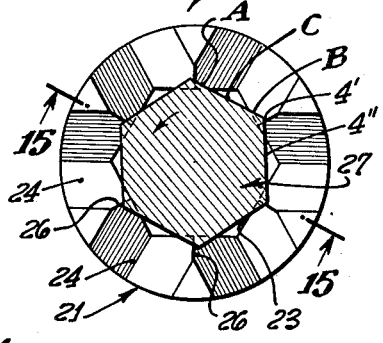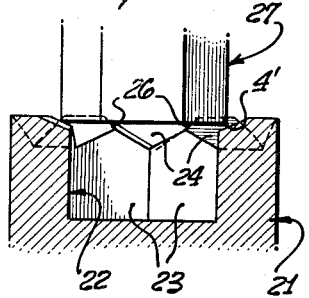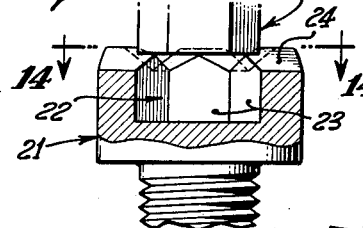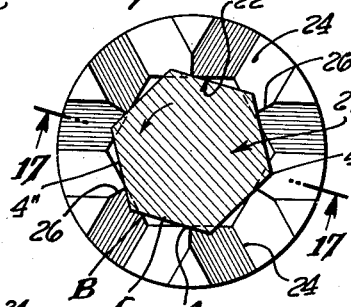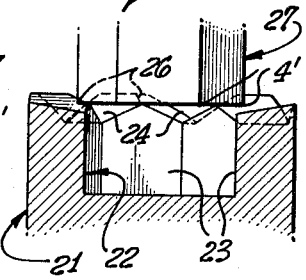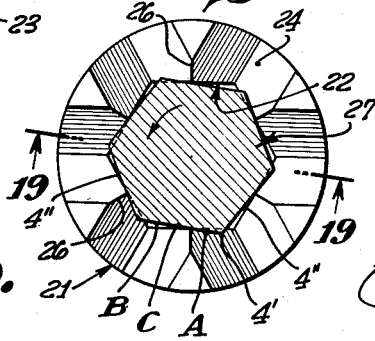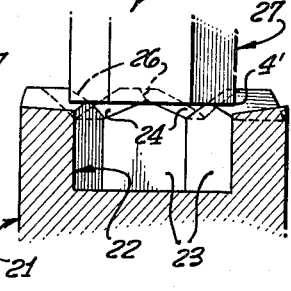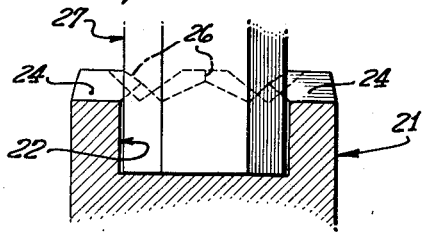

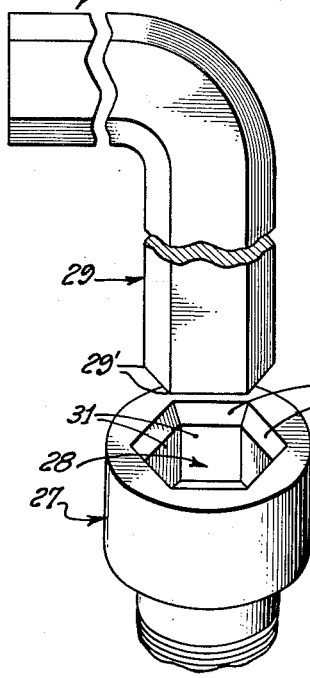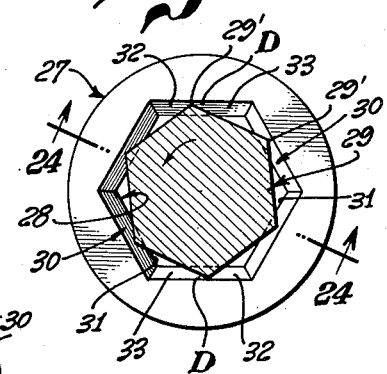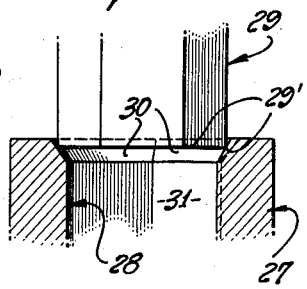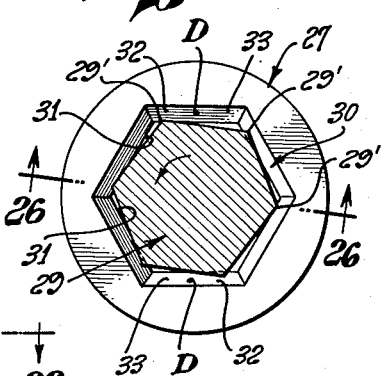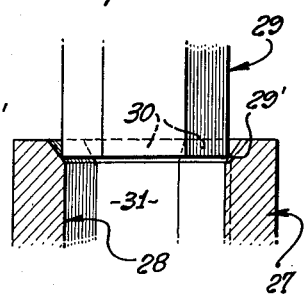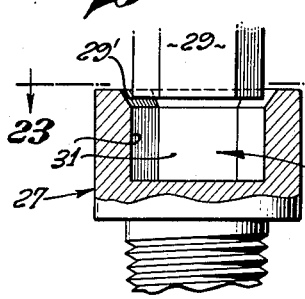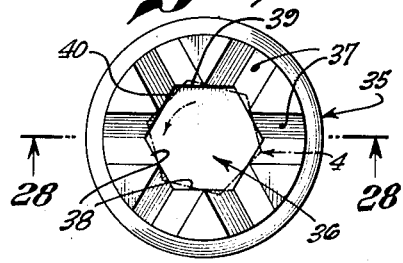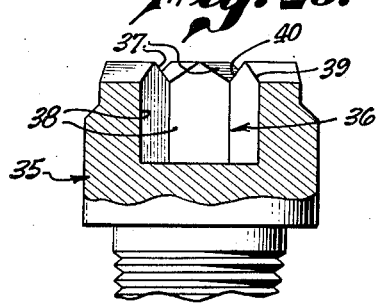

United States Patent Office 2,777,353
Patented Jan. 15, 1957

2,777,353

SCREW SOCKET CONSTRUCTION HAVING TOOL GUIDING MEANS FORMED THEREIN

Robert W. Willis, Long Beach, Calif.

Application October 30, 1952, Serial No. 317,640

6 Claims. (Cl. 85—45)

This invention relates to the construction of tool-receiving sockets for bolts, screws, plugs, pins, nuts and similar members adapted to be manipulated by means of a wrench or similar tool inserted in the sockets thereof.

It is the practice to construct such sockets and the wrenches or tools therefor, of corresponding non-circular cross section and so as to have a close fit. The close fit prevents relative turning of the tool and socketed member and provides for frictional retention of the socketed member on the tool to facilitate the application and removal of the member.

In the operation of inserting these tools in the sockets, considerable manipulation is often necessary, due to this close fit. Consequently, in confined places where the sense of touch rather than sight is relied upon to insert the tools, objectionable and difficult "fingering" is occasioned.

It is an object of the present invention to provide an improved socket construction by means of which a wrench or similar tool may be inserted into the socket without the objectionable and time consuming fingering of the tool heretofore occasioned.

It is another object of this invention to provide a tool receiving socket construction which when the tool is urged against the entrance or mouth of the socket while out of registry with the socket, will cause the tool to move readily into the socket.

It is another object of this invention to provide a socket construction of the character described which causes the member having the socket therein to be frictionally held upon the tool in a manner facilitating the desired placement thereof.

It is a further object of this invention to provide a socket construction such as described wherein the advantages herein noted are made possible by a formation of the circumferential walls of the socket at angularly spaced points about the axis of the socket, providing tool guiding portions which cause the tool to be turned about the axis thereof and to enter the socket.

It is another object hereof to provide socket construction wherein the member in which the socket is formed, is provided with tool guiding portions extending inwardly of the socket at an angle to the axis of the socket and formed by recesses permitting the tool to be placed in the guiding portions when out of registry with the socket, in order that the tool will turn about the axis thereof and enter the socket responsive to a force urging the tool against the guiding portions.

This invention possesses many other advantages and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 1 is an exploded perspective view of a member having a socket construction embodying the present invention, showing a wrench adapted to be inserted in the socket of said member;

Fig. 2 is a fragmentary vertical sectional view partly in elevation showing the socket member and wrench of Fig. 1, with the wrench in one of the positions it may be placed at the entrance of the socket when out of registry with the socket and preliminary to being turned into registry with and entering the socket;

Fig. 3 is a cross sectional view taken on the plane of line 3—3 of Fig. 2, on an enlarged scale;

Fig. 4 is a fragmentary sectional view taken on the line 4—4 of Fig. 3, but showing the wrench in elevation;

Fig. 5 is a cross sectional view corresponding to Fig. 3, showing the wrench as having been turned in a counterclockwise direction nearer to a position of registry with the socket;

Fig. 6 is a cross sectional view taken on the line 6—6 of Fig. 5, showing the wrench in elevation;

Fig. 7 is a cross section corresponding to Figs. 3 and 5, showing the wrench as further turned in a counterclockwise direction to a position but slightly out of registration with the socket;

Fig. 8 is a sectional view, taken on the line 8—8 of Fig. 7, showing the wrench in elevation;

Fig. 9 is a fragmentary vertical sectional view of the socketed member showing the wrench in side elevation as fully inserted into the socket;

Fig. 10 is a top plan view of a modified form of this invention;

Fig. 11 is a fragmentary sectional view taken on the line 11—11 of Fig. 10;

Fig. 12 is a fragmentary perspective view similar to Fig. 1, of a modified form of this invention;

Fig. 13 is a fragmentary view partly in section and partly in elevation of the form of the invention shown in Fig. 12, with the wrench in a position against the entrance of the socket and out of registry with the socket;

Fig. 14 is a cross sectional view taken on the plane of line 14—14 of Fig. 13, on an enlarged scale;

Fig. 15 is a fragmentary sectional view taken on the line 15—15 of Fig. 14, showing the wrench in elevation;

Fig. 16 is a cross sectional view corresponding to Fig. 14, but showing the tool as turned counterclockwise nearer to a position of registry with the socket;

Fig. 17 is a cross sectional view taken on the line 17—17 of Fig. 16, showing the wrench in elevation;

Fig. 18 is a cross sectional view corresponding to Figs. 14 and 16, but showing the wrench further advanced to a position but slightly out of registry with the socket;

Fig. 19 is a cross sectional view taken on the line 19—19 of Fig. 18, showing the wrench in elevation;

Fig. 20 is a fragmentary vertical view similar to Fig. 19, showing the wrench fully extended into the socket of the modified form of the invention shown in Figs. 12–19;

Fig. 21 is an exploded perspective view of another modified form of the invention showing the wrench applicable thereto;

Fig. 22 is a fragmentary vertical sectional view partly in elevation of the modified form shown in Fig. 20, showing the wrench in a position against the entrance of the socket and out of registry with the socket;

Fig. 23 is a cross sectional view taken on the line 23—23 of Fig. 22, on an enlarged scale;

Fig. 24 is a fragmentary sectional view taken on the line 24—24 of Fig. 23, showing the wrench in elevation;

Fig. 25 is a sectional view corresponding to Fig. 23, but showing the wrench as turned nearer to a position of registry with the socket;

Fig. 26 is a sectional view taken on the line 26—26 of Fig. 25, showing the wrench in elevation;

Fig. 27 is a top plan view of another modified form of this invention;

Fig. 28 is a partial vertical sectional view taken on the line 28—28 of Fig. 27;

Fig. 29 is a fragmentary elevational view of a modified form of wrench applicable to all forms of the socket construction of this invention, shown applied to a member having the socket construction of Fig. 1, said member being shown partly in section and partly in elevation;

Fig. 30 is a cross sectional view taken on the line 30—30 of Fig. 29;

Fig. 31 is a view similar to Fig. 29 of another modified form of wrench as applied to a member having the socket construction shown in Fig. 21, and Fig. 32 is a view similar to Fig. 31 of another form of wrench as applied to a member having the socket construction shown in Fig. 21.

With reference to the accompanying drawings it will be seen that the present invention may be carried out by forming in a member such as a bolt, nut or the like, having a tool receiving socket of non-circular cross section, for example hexagonal, a plurality of tool guiding portions. These portions are formed at the entrance or mouth of the socket to guide into the socket a tool or wrench having a cross section corresponding to that of the socket.

In order that the tool guiding portions be engageable by the wrench when the latter is out of registry with the socket proper, the entrance of the socket is enlarged by recessing the member in which the socket is formed. The recesses are made in such a manner that they form the guiding portions which, in all forms of this invention, extend inwardly from the entrance of the socket at an angle to the socket axis. Formed in this manner the guiding portions cause the wrench to turn about its axis and enter the socket responsive to a force urging the wrench thereagainst.

Accordingly, in the form of this invention shown in Figs. 1–9, a socket 1 of non-circular cross section, for example hexagonal, is formed in the member 2, here shown as a bolt having the socket in the head thereof. The sides 3 of a wrench 4 of hexagonal cross section are adapted to have close contact with the walls 5 of the socket when the wrench is positioned in the socket.

In accordance with this invention, the member 2 is formed with a plurality of recesses 6 which intersect the socket walls 5 at the entrance or mouth of the socket and form a plurality of guide portions 7. These guide portions extend inwardly from the entrance or mouth of the socket at an angle to the axis of the socket. The recesses 6 intersect one another at points between the meeting longitudinal margins of the walls 5 of the socket, thereby forming the guide portions 7 as sharp edges inclined inwardly from the entrance of the socket and toward the axis of the socket. Likewise, the recesses 6 are inclined inwardly toward the axis of the socket, are curved in a direction circumferentially of this axis, and have a depth such that the corners 4' of the wrench will be accommodated therein. Said guide portions 7 serve as ridges which provide substantially equal sloping edges leading to the bottom of the recess.

As a result of these formations, the member 2 at the mouth of the socket provides at the upper end of each wall 5, one of the guide portions 7 between a pair of the recesses 6. Consequently, when the wrench is positioned in the mouth of the socket while out of registration with the socket proper, the corners 4' of the wrench will be accommodated in the recesses 6 while the edges 4" between these corners will rest upon the guide portions 7. When the wrench is positioned in this manner, it is subject to turning angularly about its axis in a clockwise direction or a counterclockwise direction, according to which of the respective portions of the edges 4" are contacted with the guide portions 7.

If, as shown in Fig. 3, the wrench is positioned on the member 2 so that the portions A of the edges 4", being the portions extending in a counterclockwise direction from points C centrally of the ends of the said edges, are in contact with the guide portions 7, the wrench will be turned in a counterclockwise direction responsive to a force urging the wrench against the guide portions. On the contrary, if the portions B of the edges 4", being the portions extending in a clockwise direction from the points C, are placed on the guide portions 7, the wrench will be turned in a clockwise direction responsive to a force urging the wrench against the guide portions 7.

The turning moment of the wrench is the resultant of the forces developed in urging the transverse edge portions 4" of the wrench against the inwardly inclined edges presented by the guiding portions 7. The turning of the wrench in either direction according to which portions of the edges 4" of the wrench are positioned on the guiding portions 7, is caused by the wrench following the path of least resistance. For example, when the wrench is positioned in the recesses 6 so that it will turn in a counterclockwise direction to bring the wrench into registration with the socket proper, no portion of the member 2 is presented in the path of movement of the wrench corners 4' in a counterclockwise direction, but these corners are restrained from clockwise movement by the portions of the member 2 adjacent the guiding portion 7. This will be apparent with reference to Fig. 3, which shows that recessed portions of the member 2 adjacent the guide portions 7 will obstruct clockwise movement of the corners 4 of the wrench, whereas the portions of the recesses 6 extending in a counterclockwise direction from these corners offer no resistance to counterclockwise movement of such corners and the wrench. Accordingly, it is apparent that the reverse of the aforesaid control of the direction of turning of the wrench will take place when the wrench is positioned so that it will turn in a clockwise direction.

The turning of the wrench in either direction in accordance with this invention, assures that the wrench will enter the socket without being correctly aligned therewith before entry therein or requiring that the wrench be intentionally given a rotary movement in either direction. For example, if the wrench is positioned so that the axis thereof is an angle to the axis of the socket while the edges 4" rest on the guide portions 7, the wrench will readily turn in either direction about the axis of the socket and enter the socket responsive to merely being urged in a direction axially thereof against the guide portions. If the wrench were permitted to turn in but one direction about the axis of the socket, it would not enter the socket as readily and in some instances would be restrained from entering the socket due to the manner in which the wrench might be positioned and manipulated. Thus, in accordance with the present invention, no matter in what position the wrench is held while the edges 4" thereof are urged into contact with the guide portions 7, the wrench will turn automatically in either direction into alignment with and enter the socket.

Figures 2, 3 and 4, show the wrench in an initial position such that the corners 4' extend into the recesses 6 while the portions A of the edges 4" extending in a counterclockwise direction from center points C are disposed on the guide portions 7. Thus, the tool will be turned in a counterclockwise direction into registration with and enter the socket responsive to a force urging the tool against the guide portions.

Figs. 5 and 6 show how the wrench is turned in a counterclockwise direction toward a position of registration with the socket proper, after having been positioned as shown in Figs. 2, 3 and 4. Figs. 5, 7 and 8 show how the wrench is advanced further in a counter-clockwise direction to a position but slightly out of registration with the socket proper, and Fig. 9 shows the wrench after it has fully entered the socket.

It will now be apparent that by reason of the recesses 6 and guide portions 7 as here provided, it is possible to place the wrench against the member 2 at the entrance of the socket and set the wrench properly in the socket without the time consuming and objectionable fingering of the wrench as heretofore occasioned.

A modified form of this invention as shown in Figs. 10 and 11 is embodied in a member 15, such as a bolt, having the head thereof provided with a hexagonal socket 16. The member 15 is formed with semi-circular recesses 17 extending transversely in the outer end thereof and intersecting one another and the walls 18 of the socket in the same manner as the recesses 6 in the form of the invention shown in Figs. 1–9. Thus, tool guiding portions 19 are formed on the member 15 in the same manner as the guiding portions 7 in the first described form of this invention. The guiding portions 19 extend inwardly from the entrance end of the socket and radially toward the axis of the socket, and cause a wrench corresponding to the wrench shown in Fig. 1 to be turned and to enter the socket in the same manner as shown in Figs. 3–9.

Another modified form of this invention is embodied in a member 21, such as a bolt, as shown in Figs. 12–20. The member 21 is provided with a hexagonal socket 22 having its walls 23 intersected at the entrance of the socket by means of recesses 24 of V-shape in cross section. These recesses intersect the walls 23 and one another in the same manner as the recesses in the previously described forms of this invention, thereby forming tool guiding portions 26 identical with those in such previously described forms. Figs. 13–20 show how the wrench 27 when placed on the guiding portions 26 will be turned progressively into registration with the socket proper so as to enter the socket responsive to a force urging it against the guiding portions. In this form, the direction in which the wrench will be turned depends upon the manner in which the edges of the wrench between the corners are engaged with the guiding portions, this operation being the same as in the first described form of the invention.

Another modification of this invention, as shown in Figs. 21–26, is embodied in a member 27, such as a bolt having a wrench receiving socket 28 in the head thereof. This socket is of non-circular cross section, for example, hexagonal, for reception of a wrench 29 of corresponding cross section. Recesses 30 are formed in the member 27 at the entrance of the socket 28 so as to intersect the socket walls 31. These recesses provide guiding portions 32 and 33 constituting parts of the inclined surfaces in the member 27 defined by the recesses. These surfaces extend inwardly from the entrance of the socket towards the socket axis and in a direction circumferentially of the socket. The guiding portions 32 and 33 on these surfaces likewise extend in a direction circumferentially of the socket.

When the wrench 29 is positioned as shown in Figs. 22–24 at the entrance of the socket, while out of registration with the socket proper, the recesses 30 permit the placement of the corners 29' upon the wrench guiding portions 32 and 33. Thus positioned, the wrench will turn about its axis and enter the socket responsive to a force urging the wrench against the guiding portions. The turning of the wrench about its axis so as to enter the socket is caused by the corners 29' riding downwardly on the guide portions in a direction circumferentially of the socket.

The direction in which the wrench will turn when urged against the guide portions 32 and 33 depends upon whether the wrench corners 29' are placed on the guide portions 32 or the guide portions 33. The guide portions 32 extend in a counterclockwise direction from points D centrally of the recesses 30, whereas the guide portions 33 extend from the points D in a clockwise direction.

When the corners 29' of the wrench are positioned at either side of the center point D on the guide portions 32 or 33, these corners are disposed inwardly of positions they would occupy if placed on the center points D. The greater the spacing of these corners from the center points D (compare Figs. 25 and 26 with Figs. 23 and 24), the further inwardly the wrench is disposed in the socket. This is due to the fact that the spaces on center lines extending diametrically between the center points D of the opposed recesses 30 are less than the spaces across the socket between the opposed recesses on lines extending angularly with respect to said center lines.

Accordingly, as shown in Figs. 22–24, when the corners 29' are positioned on the guide portions 32 which extend in a counterclockwise direction from the center points D, these corners are disposed inwardly of the points they would occupy if placed on the center points D. Consequently, when a force is applied urging the wrench inwardly, it will ride downwardly and inwardly while turning in a counterclockwise direction to the position shown in Figs. 25 and 26, and finally come into registration with and enter the socket 28.

This directional movement is caused due to the fact that surfaces of the recesses 30, which extend in a clockwise direction from the corners 29', resist turning movement of the wrench in that direction, while the surfaces of the recesses extending from the corners 29' in a counterclockwise direction offer no resistance to the movement of the wrench in the latter direction. If the wrench is intentionally turned in a clockwise direction when positioned as shown in Figs. 23 and 24, it will ride upwardly towards the center points D and move further out of registration rather than towards registration with the socket.

It will now be apparent that if the corners 29' of the wrench are placed on the guide portions 33 which extend in a clockwise direction from the center points D, the wrench will turn in a clockwise direction and enter the socket responsive to a force urging it against the guide portions.

Another modified form of this invention, as shown in Figs. 27 and 28, is embodied in a member 35, here shown as a bolt. This member has a wrench receiving socket 36, in this instance of hexagonal cross section and adapted to receive a wrench, not shown, for example the wrench shown in Figs. 1–9. In this modified form recesses 37 of V-shape in cross section are formed in the member 35 in the same manner as shown in Figs. 12–20, except that they do not intersect one another. However, they do intersect the walls 38 of the socket so as to form guide portions 39 and 40 extending inwardly from the entrance of the socket in opposite directions circumferentially of the socket. These guide portions cause a wrench such as the wrench shown in Figs. 1–9 to turn counterclockwise or clockwise depending upon which of the edge portions A and B on opposite sides of the center point C of the wrench are contacted with the guiding portions 39 and 40. If the edge portions A are positioned on the guide portions 39, the wrench will turn in a counterclockwise direction, in a manner as stated in connection with the form of the invention shown in Figs. 1–9. If the edge portions B are positioned on the guide portions 40, the wrench will be turned in a clockwise direction.

It will now be apparent that in all forms of the invention the guide portions which cause the wrench to turn from a position out of registry with the socket to a position where it will enter the socket, are formed by recessing the member having the socket therein in a manner causing the guide portions to be inclined inwardly from the entrance of the socket.

Figs. 29 and 30 show a modified form of wrench 41 applicable to all forms of this invention. This wrench has a reduced cylindrical end 42 serving as a pilot for facilitating the placement of the wrench in the entrance of the socket. For purposes of illustration, this wrench is shown in connection with a member 43 which is identical with the form of the invention shown in Figs. 1–9.

Another modified form of wrench 44 is shown in Fig. 31, as applicable to a member 45 embodying the socket construction shown in Figs. 21–26. This wrench is provided with a bevelled end 46 to facilitate entrance of the wrench into the socket of this or any of the other forms of the invention.

Another modified form of wrench 47, as shown in Fig. 32, also applicable to any of the forms of this invention, is provided with an annular recess 48 containing an elastic ring 49. This ring is adapted to frictionally contact the walls of the socket into which it is placed to retain the socketed member 50 on the wrench.

I claim:

1. A member having a socket of non-circular cross section which is symmetrical about the axis of said socket for reception of a tool of corresponding cross section, said member having a plurality of recesses intersecting one another at the entrance of the socket and forming by said intersections at the outer end of each socket wall a tool guiding ridge extending radially of the socket and being inwardly inclined from said entrance, said ridge providing substantially equal sloping edges leading to the bottom of the recess.

2. A member having a socket of non-circular cross section for reception of a tool of corresponding cross section; said socket having angularly related planar walls; said member having recesses intersecting the meeting edges of said walls at the entrance of the socket; said recesses forming at the outer end of each socket wall a tool guiding ridge portion having substantially equal sloping edges leading to the bottom of the recess and said recesses extending inwardly from said entrance and in opposite directions circumferentially of the socket, and each of said recesses intersecting the meeting edges of a pair of said walls at the entrance only of said socket.

3. A member having a hexagonal tool receiving socket; said member having recesses angularly spaced about the axis of the socket and intersecting the meeting edges of the socket walls at the entrance of the socket; said recesses forming a pair of tool guiding ridge portions at the outer end of each socket wall; said guiding portions divergently extending inwardly to provide equal sloping edges leading to the bottom of said recess and said guiding portions extending from said entrance at an angle to said socket as well as circumferentially of said socket, and each of said recesses intersecting the meeting edges of a pair of said walls at the entrance only of said socket.

4. A member having a socket of polygonal cross section for reception of a tool of corresponding cross section; tool guiding ridges on said member at points angularly spaced about the entrance of said socket; each tool guiding ridge being inclined from said entrance inwardly of the socket toward the said axis; said member having recesses intersecting meeting edges of the socket walls at the entrance of the socket between said ridges for accommodating the corners of the tool while the edges of the tool between the corners are in contact with said tool guiding ridges said ridges providing equal sloping edges leading to the bottom of the recess.

5. Socket construction including: a member having a socket of rectilinear and symmetrical cross section about the axis of said socket adapted to receive a tool of corresponding cross section having transverse edges between the corners thereof; said member having tool guiding recesses at the outer ends of the socket walls; said recesses intersecting one another and forming tool guiding ridges therebetween intermediate the side margins of said walls said ridges providing substantially equal sloping edges leading to the bottom of the recess; said ridges contacting said transverse edges when the latter are urged thereagainst while the tool is out of registry with the socket, thereby causing said tool to turn about its axis in either direction into registry with the socket depending upon which sides of a point centrally of the ends of said edges are urged against said ridges.

6. A socket construction comprising: a member having a socket of rectilinear and symmetrical cross section about the axis of said socket adapted to receive a tool of corresponding cross section; said socket being defined between angularly related planar side walls which are joined along side edges thereof and which extend for the greater portion of the depth of the socket; said walls being parallel with the axis of the socket for the greater portion of the depth of the socket; said member having a circular series of recesses therein merging with the outer ends of said walls and forming ridge guide portions which are engageable by an end of the tool when the latter is positioned thereagainst while out of registry with the socket; said guide ridge portions providing substantially equal sloping edges leading to the bottom of the recess, said guide portions being inclined and of such extent with respect to said walls that upon urging said tool against said guide portions, the tool will be turned so as to register with and enter said socket.

References Cited in the file of this patent

UNITED STATES PATENTS

| | | |
|---|---|---|
| 975,285 | Robertson | Nov. 8, 1910 |
| 1,298,397 | Purple | Mar. 25, 1916 |
| 2,202,240 | Trotter | May 28, 1940 |
| 2,397,216 | Stellin | Mar. 26, 1946 |
| 2,445,978 | Stellin | July 27, 1948 |

FOREIGN PATENTS

| | | |
|---|---|---|
| 22,547 | Great Britain | 1912 |
| 389,105 | Great Britain | Mar. 8, 1933 |
| 562,248 | Great Britain | June 23, 1944 |